United States Patent Office 3,478,009
Patented Nov. 11, 1969

3,478,009
ADSORBENT REFINING OF ORGANIC COMPOUNDS
Colin A. Genge, Wilmington, Del., assignor to Hercules Incorporated, Wilmington, Del., a corporation of Delaware
No Drawing. Filed July 29, 1966, Ser. No. 568,755
Int. Cl. C09f *1/02;* C07c *127/10;* B01j *11/78*
U.S. Cl. 260—97.7                     4 Claims This invention relates to a process for refining and purifying organic compounds. More particularly, it relates to a process for removing undesired compounds of sulfur and of chlorine from liquids containing them, as well as the organic compound to be purified, and to the adsorbent compositions employed therefor.

Due to their content of sulfur compounds and/or chlorine compounds, many process streams, reaction products and naturally occurring materials are rendered less suitable or wholly unfit for their ultimate uses. Such impurities are often the cause of malodor, corrosion, fouling of equipment, and poisoning of catalysts. To eliminate or mitigate these and similar undesirable features, and also to obtain the benefits which usually accompany the use of pure materials, it is highly desirable to reduce the concentration of the types of contaminants mentioned to levels which will not be considered objectionable.

This is efficiently and conveniently realized, in accordance with the present invention, by bringing such contaminated liquids into intimate contact with particular adsorbent materials which comprise composited mixtures of a basic alumina and certain silver compositions. By proceeding in a manner to be described, the amounts of the chlorine compounds and the sulfur compounds contained in various liquids can be reduced to innocuous or negligible quantities. Furthermore, the process of this invention is carried out at low temperatures, thus providing economical and convenient working conditions and affording the utmost in protection to heat-sensitive materials. The use of adsorbents which are relatively inexpensive and simple to prepare further enhances the economy and convenience of this process.

To obtain the fullest benefit from the present process, it is essential that the adsorbent employed be composed of basic alumina supporting at least one of a limited number of silver-containing materials. The results obtained in the process of this invention indicate that the particular adsorbents employed herein are responsible for the outstanding results achieved. These adsorbents are, more specifically, novel combinations of a relatively basic alumina, having an acid equivalency falling within a definite range, with silver nitrate, silver fluoride, silver tetrafluoroborate, silver hexafluorosilicate, silver hexafluorophosphate, silver hexafluoroantimonate, and a silver-silver oxide mixture.

An alumina suitable for use in this process must have an acid equivalency in the range of from about $8 \times 10^{-8}$ percent of $H_2SO_4$ to about $5 \times 10^{-5}$ percent of $H_2SO_4$. Such aluminas include, for example, commercially available Woëlm basic alumina, Harshaw basic alumina and Alcoa F-20 basic alumina. Benesi (J. Amer. Chem. Soc. 78 (1956) 5490) has described a technique for characterizing the degree of acidity of an alumina surface. By his method, a few drops of benzene solution of one of a series of organic dyes is added to a slurry of the alumina in benzene. By noting color changes of the dyes, a correlation between the alumina surface acidity and an approximate concentration of $H_2SO_4$ can be made. In this manner, it has been determined that the aluminas which are suitable for use in this invention are those which are characterized as relatively basic, i.e., having the aforesaid acid equivalencies.

A series of tests was performed using, as the support for silver nitrate, basic aluminas, acid alumina and common supports other than alumina; it demonstrates the necessity of using basic alumina in this invention. In these tests, a column, seven inches high and 18 mm. in diameter, was packed with a composited mixture of about 1 part of silver nitrate and about 10 parts of one of the supports. Following a preliminary column wash with toluene, a quantity of technical grade 1-(dihydrodicyclopentadienyl)-3,3-dimethylurea containing a small amount of sulfur compounds, was dissolved in toluene and passed through the column under ambient conditions (about 25° C. and atmospheric pressure) at a rate of about 3.3 ml./minute. The column was then carefully washed with three passes of toluene to remove the 1-(dihydrodicyclopentadienyl)-3,3-dimethylurea. The solvent was evaporated away from all of the column effluents except that which resulted from the preliminary column wash. The solid residue was then analyzed by X-ray fluorescence to determine its sulfur content. By referring to Table I, which follows, the relative efficiency of the various supports tested in aiding the adsorption of compounds containing sulfur can be seen. It will be noted that both the Woëlm and the Harshaw basic alumina combinations reduced the sulfur content to below ten p.p.m., ten p.p.m. being the lower limit of detection for sulfur in this type of compound by the analytical method employed. In other compounds containing only carbon and hydrogen, the detection limit for sulfur was 5 p.p.m. The realization that the basic aluminas helped to bring the content of sulfur compounds to the low values shown, from initial concentrations which were significantly higher than in any of the other tests, emphasizes the superiority of those supports.

TABLE I

| Support | Sulfur Content (p.p.m.) Before Adsorption | After Adsorption |
|---|---|---|
| Woëlm Basic Alumina | 766 | 10 |
| Harshaw Basic Alumina | 766 | 10 |
| Alcoa F-20 Basic Alumina | 766 | 17 |
| Woëlm Acid Alumina | 425 | 83 |
| Florisil | 425 | 90 |
| Silicic Acid | 532 | 99 |
| Charcoal (Activated Coconut) | 425 | 162 |
| Celite | 425 | 188 |
| Silica Gel | 532 | 279 |
| Molecular Sieve 4A Powder | 425 | 286 |

The instant invention requires that the adsorbent employed be a composited mixture of a silver composition supported on basic alumina. Such composited mixtures may be prepared by any suitable method; however, the method used should be one which provides the maximum distribution of the silver composition over the surface of the alumina. A preferred method for the preparation of these mixtures comprises wetting particles of the alumina with a solvent in which the silver composition is very soluble, after which the silver composition in finely divided form is added to, and mixed with, the wetted alumina. An approximately mono-molecular dispersion of the silver composition is thereby formed on the surface of the alumina particles. Removal of the solvent completes the preparation. This method is illustrated with particularity in the following example: all parts are by weight.

EXAMPLE 1

Distilled water was incrementally added with agitation to 200 parts of catalyst-grade Harshaw activated alumina in a suitable vessel, until 30 parts of water had been introduced. After equilibrium between the alumina and the water was attained (in about 2.5 hours), the mixture was transferred to a motor-driven rotary mixing apparatus. Twenty parts of silver nitrate (Baker and Adamson reagent-grade crystals) ground to a fine powder was added, in small increments with agitation, to the water/alumina mixture. The three components were then mixed for about two hours at about 25° C. by rotating the apparatus at an approximate rate of 60 r.p.m. After vacuum drying at 70° C. for 66 hours, the adsorbent so prepared was cooled and stored in amber glass bottles.

It is disclosed above that the use of a basic alumina support is essential to obtain maximum benefit from this invention. It has further been experimentally established that the excellent results achieved herein are possible only through the use of such aluminas treated with the most soluble of silver compounds. Thus, the preferred silver compounds, considering practicality as well as effectiveness, are silver nitrate and silver fluoride, both of which are very soluble in water. Other water-soluble silver compounds, such as, for example silver tetrafluoroborate, silver hexafluorosilicate, silver hexafluorophosphate and silver hexafluoroantimonate may also be used effectively. Once having combined the basic alumina support with silver nitrate, heating the combination to 600° C. causes reduction of the silver nitrate to a mixture of silver and silver oxide in the ratio of about 81 parts silver to 19 parts silver oxide. The product is an adsorbent which is extremely effective in removing sulfur compounds, and it is also inexpensive to prepare.

A correlation exists between solubility in water of the silver compound with which the alumina is treated and its effectiveness in aiding the removal of sulfur compounds. While the correlation is by no means direct, silver nitrate and silver fluoride, for example, which are very soluble, are exceptionally good in the process of this invention; less soluble silver compounds, such as silver sulfate, silver acetate and silver carbonate remove sulfur compounds with some efficiency; whereas, relatively insoluble silver salts such as silver sulfide, silver cyanide and silver chloride are practically worthless for this utility.

The effectiveness of compounds of metals other than silver, which might have been expected to be equally suitable for this use, was also investigated. Thus, compounds of copper composited with Woëlm basic alumina, including copper powder, cuprous chloride, cuprous cyanide, cuprous oxide and cuprous sulfide, were no better in removing sulfur compounds than was the alumina alone. Similarly, cupric nitrate was found to be relatively ineffective, and resulted in a highly contaminated product. Mercuric nitrate was tried, with poor results. Samples of potassium chloroplatinate and aurous chloride (which, unlike its silver counterpart, is quite soluble), composited with basic alumina, were also investigated, and found to be quite ineffective for the present purpose. Cadmium nitrate was tried and found to be wholly unsuitable. Of all the non-silver compounds tested, the compound which functioned most satisfactorily was palladium nitrate. Composited with basic alumina, that compound succeeded in reducing an original content of 500 p.p.m. of sulfur compounds to 55 p.p.m. While this result is better than those achieved with other non-silver compounds, it is unsatisfactory when compared with the effectiveness of, for example, silver nitrate. As shown in Table I, silver nitrate composited with either Woëlm or Harshaw basic alumina succeeded in reducing the content of sulfur compounds from 766 p.p.m. to less than 10 p.p.m. In addition to their relative inefficiency, many of the non-silver compounds are expensive, difficult to obtain and tend to cause contamination of process streams, thus making them all the more unsuitable for use in the process of the present invention.

A greater than additive effect was noted when one of the preferred silver compounds was employed with the above-specified type of basic alumina. Thus, charges of the alumina alone, silver nitrate powder alone, and a composited ten-to-one mixture of the alumina and silver nitrate, into separate adsorption columns having the same dimensions, gave the following results: the alumina alone reduced the content of sulfur compounds in 1-(dihydrodicyclopentadienyl)-3,3-dimethylurea from 425 to 103 p.p.m. Passage of a second portion of the same material through the column packed only with silver nitrate reduced the content of sulfur compounds to 230 p.p.m. The content of sulfur-containing compounds in a third portion was, however, reduced to less than 10 p.p.m. by passage through the silver nitrate-alumina column, clearly, a more than additive result.

The mechanism by which sulfur compounds are removed in accordance with this invention is thought to be one in which insoluble complexes are formed with the composited silver materials. It follows that the sulfur compounds which should be the most readily removed are those that are the most apt to form such complexes; this has, in fact, been found to be the case. Thus, it has been found that compounds that are known to form such complexes are invariably removed by this method; mercaptans, disulfides and thioureas, for example, are readily extracted from liquids containing them using the adsorbent materials of this invention.

The nature of the liquid to be refined is of little significance to the operability of this process. Such a liquid must, however, be inert to the adsorbent employed, or relatively so, and not of a type that will tend to cause or promote the decomposition of the adsorbent. Furthermore, for reasons of practicality, the liquid should be fluid enough so that it will flow about the adsorbent at the temperatures of operation.

Where the liquid contacting the adsorbent is unreactive or only slightly reactive to silver or its compounds, no problem of silver contamination in the product arises. Where this is not the case, however, and decomposition of the adsorbent is encountered, in some instances solubilization of the silver can be minimized by the proper choice of the alumina support. Thus, use of an alumina comprising chi-$Al_2O_3$, such as the Harshaw and Woëlm aluminas, to purify a nitrile-containing composition resulted in a product containing about 0.5% of silver. Substitution of Alcoa F–20 alumina, which comprises alpha-$Al_2O(OH)_2$, resulted in a product containing, on the average, about 20 p.p.m. by weight of silver. As a practical matter, the amount of silver remaining can be further reduced by passage of the product through a column packed with sodium bicarbonate or sodium carbonate. Conversion of the soluble silver into insoluble silver carbonate in this manner effectively reduces the silver content to below the lower limit of detection by the X-ray fluorescence method, i.e., below 5 p.p.m.

In the process of this invention, the removal of sulfur compounds can be effected at very low temperatures; this is a primary benefit of the process, since it enables the purification of liquids which are sensitive to heat and thus are not compatible with the higher temperature processes of the prior art. It has, in fact, been found that the efficiency of the present process in effecting the removal of sulfur compounds is greater at the lower temperatures. In removing sulfur compounds from 1 - (dihydrodicyclopentadienyl)-3,3-dimethylurea at 80° C., 47% of the silver nitrate composited on alumina was used effectively, that is, in the formation of insoluble complexes. At 50° C. the effective amount rose to 68%, and at 25° C. 92% of the silver nitrate was effective. Tests at temperatures in the range of −35° C. to 25° C., using sulfate turpentine as the contaminated material, indicated that additional small increases in efficiency were possible at these lower temperatures. While it is generally desirable to operate at the lowest possible temperatures, other factors must be considered. Upon optimization of these factors, such as excessive viscosity, insolubility of the contaminated solute, freezing points, decomposition, and costs of cooling and heating, it is often found that ambient temperatures (about 25° C.) are the most desirable ones for operation, depending largely upon the nature of the material to be refined. Temperatures ranging from about −35° C. to about 150° C. have, however, been found to be suitable.

As disclosed above, it is possible by the process of this invention to refine many types of liquids by the removal of numerous compounds of sulfur. The following examples will serve to illustrate this aspect of the invention, all parts and percentages being by weight.

EXAMPLE 2

Desulfurization of 1-(dihydrodicyclopentadienyl)-3,3-dimethylurea

A column seven inches high and 18 millimeters in diameter was dry-packed with about 50 parts of the silver nitrate/alumina adsorbent prepared by the method outlined in Example 1. The packing was densified by tapping the column wall, and then washed with about 130 parts of toluene. Four parts of technical grade 1-(dihydrodicyclopentadienyl)-3,3-dimethylurea, which was known to contain 766 parts per million of sulfur compounds was dissolved in 130 parts of toluene and the resulting solution was then passed through the adsorbent bed; passage of the entire sample through the column required about 45 minutes. The effluent from the column was collected and saved. Then the column was cleansed with three toluene washes, each comprising 130 parts of toluene, and the effluents thereof were also collected and saved. After removing the toluene from each of the four effluents collected, by evaporation on a steam bath under a nitrogen sparge, the residues were redissolved, combined and placed in a tared vessel. Following removal of the toluene as above, the residue was dried in a vacuum oven at 70° C. for about 16 hours. Analysis by X-ray fluorescence of the 3.25 parts of solid recovered (81.3% recovery) showed that the sulfur content was reduced from the original level of 766 p.p.m. to below the lower limit of detection by the analytical method used, that limit being 10 p.p.m.

EXAMPLE 3

Desulfurization of sulfate turpentine

The procedure outlined in Example 1 was used to prepare the adsorbent for this example; however, Woëlm basic alumina (300 parts) was used instead of the Harshaw. Distilled water and finely ground silver nitrate were employed in quantities proportioned to those used in example 1, based on the weight of the alumina. Vacuum drying at 70° C. was accomplished in 72 hours.

A column, one centimeter in diameter and 23 centimeters high, was prepared using 22 parts of the adsorbent. Malodorous sulfate turpentine, light yellow in color, was passed through the column at an average rate of about 78 parts per hour, a total of about 186 parts being refined. The column effluent was collected in four approximately equal fractions, analysis of which showed sulfur concentrations, in order of collection, amounting to 33, 42, 58 and 68 parts per million. This represents an average reduction to 48 parts per million from an initial level of 219. In addition, the product had the water-white appearance and sweet odor characteristic of distilled wood turpentine. This example was carried out at an ambient temperature of about 25° C.

EXAMPLE 4

Desulfurization of fatty nitrile

The adsorbent for this example was prepared using the method and the proportions of silver nitrate and distilled water specified in Example 1; however 200 parts of Alcoa F-20 chromatographic grade alumina was substituted for the Harshaw alumina; the adsorbent was dried in a vacuum oven for 44.5 hours at 70° C. Passage of 103 parts of distilled fatty nitrile, consisting primarily of oleyl and linoleyl nitriles, through a column one centimeter in diameter, dry-packed to a height of about 23 centimeters with the above adsorbent, required about 2⅓ hours. Five fractions of effluent were collected containing in respective order 11, 12, 13, 15 and 18 parts per million of sulfur, representing a reduction in sulfur concentration from the initial value of 53 p.p.m. to an average value of 14 p.p.m.

EXAMPLE 5

Desulfurization of esterified tall oil rosin

An adsorbent prepared as in Example 3, using Woëlm basic alumina, was employed in this example; drying of this adsorbent was, however, carried out at 70° C. for 65 hours. The column, 18 millimeters in diameter and seven inches high, was packed with 50 parts of the adsorbent and wetted with about 99 parts of n-hexane containing 5 p.p.m. of sulfur. About 5 parts of the methyl ester of tall oil rosin, dissolved in about 66 parts of n-hexane, was thereupon passed through the column. The effluent, along with the effluents from three subsequent washes of the column, each of which comprised about 66 parts of n-hexane, was recovered and the solvent evaporated. The original sample, 63% of which was ultimately recovered, contained about 444 p.p.m. of sulfur and was brown, whereas the final product analyzed at only 18 p.p.m. of sulfur and was nearly water-white.

EXAMPLE 6

Desulfurization of polyterpene

In this example the column, which was one centimeter in diameter and 23 centimeters in length, was maintained at 100° C. The samples and the washes were preheated to the same temperature. The adsorbent, which comprised 22 parts of the same type of adsorbent used in Example 3, was packed into the column and washed with 59 parts of p-menthane. Then 10 parts of the polyterpene dissolved in 79 parts of p-menthane was passed through the column, followed by a wash with 59 parts of p-menthane. The p-menthane was vacuum stripped from the effluents of the sample and subsequent wash, and the residue, which was lighter in color than the original sample, was analyzed for sulfur content. Two more samples of the same quantity of the polyterpene were subsequently passed through the column and treated in the same way as the first. In all cases, passage through the column reduced the sulfur content from 14 p.p.m. to less than 5 p.p.m. Recoveries of the first, second and third samples were 92, 99 and 98 percent, respectively.

EXAMPLES 7–10

Desulfurization of 1-(dihydrodicyclopentadienyl)-3,3-dimethylurea

Binary mixtures consisting of Woëlm basic alumina plus each of 12.0 weight percent of silver tetrafluoroborate (1), 9.6 weight percent of silver hexafluorosilicate (2), 13.0 weight percent silver hexafluorophosphate (3) and 17.0 weight percent of silver hexafluoroantimonate (4) were prepared, following generally the procedure of Example 1. In each of these mixtures the amount of silver compound used provided a silver:alumina ratio equivalent to that provided by the silver nitrate and alumina (1:10) in Example 1.

Each of the above adsorbents was evaluated in a fully-packed column two centimeters in diameter and seven inches in length. The test solution contained four parts of 1-(dihydrodicyclopentadienyl)-3,3-dimethylurea dissolved in 130 parts of toluene. The urea contained 782 parts per million of sulfur compounds and 318 parts per million of chlorine compounds. Following the procedure of Example 2, the results obtained are as shown in Table II.

TABLE II

| Silver Compound on Alumina | Solids Recovery, Percent | Sulfur Compounds, p.p.m. | Chlorine Compounds, p.p.m |
|---|---|---|---|
| 1 | 87 | 17 | 24 |
| 2 | 87 | 14 | 35 |
| 3 | 97 | 30 | 148 |
| 4 | 76 | 14 | 33 |

In much of the foregoing discussion, purification through the removal of sulfur compounds has been illustrated. However, the same adsorbents effective in removing the undesired compounds of sulfur are also of use in removing undesired compounds of chlorine. In this application, however, silver nitrate and silver fluoride, composited with the basic alumina, were found to be much more effective in removing chlorine compounds than was a silver-silver oxide mixture on the same support. For example, a ten-to-one composited mixture of basic alumina and silver nitrate reduced the chlorine compounds contained in 1-(dihydrodicyclopentadienyl)-3,3-dimethylurea from 265 p.p.m. to 50 p.p.m. When, however, a sample of that adsorbent was heated to 600° C. to reduce the silver nitrate to the silver-silver oxide mixture, it succeeded in reducing the content of chlorine compounds only to 119 p.p.m.

One characteristic of the use of these adsorbents to remove chlorine compounds is that the inverse temperature effect, noted with respect to the removal of sulfur compounds, is not encountered. Thus, in removing chloine compounds from a polyterpene, as in Example 12 following, the effectiveness of the purification increased with increasing temperature in the range of from about 0° C. to about 60° C. Between 60° C. and 160° C., however, a slight decrease was noted at the higher temperatures. While the temperature range may be about the same as that used for removal of sulfur compounds, for many materials a temperature ranging from about 50° C. to about 70° C. has been found to be best.

The difference in reactivity of chlorine compounds towards the adsorbents must also be considered, if ineffectiveness and contamination with silver or undesirable reaction products are to be avoided. Thus, chloroform and carbon tetrachloride are chlorine-containing compounds which are quite stable to silver nitrate on alumina at 100° C. A compound such as chlorocyclohexane, on the other hand, is very unstable under the same conditions, as measured by its quantitative dehydrohalogenation to cyclohexene.

The following examples, in addition to Examples 7–10, are illustrative of the embodiment of this invention pertaining to removal of chlorine-containing compounds. All parts and percentages specified are by weight.

EXAMPLE 11

Dechlorination of 1-(dihydrodicyclopentadienyl)-3,3-dimethylurea

With reference to Example 2 above, the sample of 1-(dihydrodicyclopentadienyl) - 3,3-dimethylurea treated therein originally contained, in addition to 766 p.p.m. of sulfur compounds, 265 p.p.m. of chlorine compounds. Treatment under that example effected the concurrent removal of chlorine compounds as well as those containing sulfur, to the extent that the chlorine content was reduced below the lower level of detection by the X-ray fluorescence analytical methods used. The amount of the chlorine compounds in the product was less than 10 p.p.m.

EXAMPLE 12

Dechlorination of polyterpene

Referring to Example 6, the samples of polyterpene treated therein contained 105 p.p.m. of chlorine-containing materials, as well as the original 14 p.p.m. of sulfur compounds. Concurrent removal of sulfur and chlorine compounds in that treatment resulted in three successive samples containing 23, 27 and 25 p.p.m. of chlorine-containing compounds, respectively.

While the process of this invention has been illustrated primarily with respect to contact of the liquids to be refined with the adsorbents packed into columns, the invention is not so limited. Any alternative means or apparatus may be employed to bring about the requisite contact. Thus, for example, a batch-type process may be carried out wherein the contaminated material, dissolved in a solvent if necessary, is mixed in a suitable vessel with the adsorbent material, and the refined liquid is subsequently separated from the adsorbent, as by filtration or decantation.

The process also may be effected in stages, such as where a number of columns are connected in series. Such columns may be operated at different temperatures to achieve a desired result. Also, the columns may contain different adsorbents, and some of the columns may contain other chemicals to accomplish a desired result.

It should be understood that this invention is suitable for the purification of solid materials, as well as for those materials that occur in liquid form. In the case of solids purification, the material is, however, usually initially dissolved in a solvent which is suitable, considering the nature of both the solute end of the adsorbent material employed. Some low melting solids may, however, be heated above their melting points and maintained as liquids by proper temperature control during operation of the process disclosed herein.

What I claim and desire to protect by Letters Patent is:

1. A process for purifying liquid characterized by being at least relatively inert to the composited mixture hereinafter recited, of a type that does not tend to cause decomposition of said composited mixture, fluid enough to flow about said composited mixture when at a temperature in the following recited temperature range, and containing at least one impurity selected from the group consisting of sulfur compounds and chlorine compounds, which comprises contacting said liquid in a temperature range from about −35 to about 150° centigrade with a composited mixture consisting essentially of (1) material selected from the group consisting of silver nitrate, silver fluoride, silver tetrafluoroborate, silver hexafluorosilicate, silver hexafluorophosphate, silver hexafluoroantimonate and silver-silver oxide mixture and (2) basic alumina, the acid equivalency of which is in the range from about $8 \times 10^{-8}$ to about $5 \times 10^{-5}\%$ of $H_2SO_4$.

2. A process according to claim 1 wherein the composited mixture consists essentially of silver nitrate and said alumina.

3. A process according to claim 1 wherein the composited mixture consists essentially of silver fluoride and said alumina.

4. A process according to claim 1 wherein the composited mixture consists essentially of said alumina and silver-silver oxide mixture in which the weight ratio of silver to silver oxide is about 81:19.

References Cited

UNITED STATES PATENTS

| 1,938,693 | 12/1933 | Gillespie et al. | 260—97.5 |
| 2,374,975 | 5/1945 | Borglin | 260—97.7 |
| 2,495,852 | 1/1950 | Lien et al. | 196—14.25 |
| 2,927,903 | 3/1960 | Nixon | 252—466 |
| 3,232,028 | 2/1966 | McDonald et al. | 252—476 |

DONALD E. CZAJA, Primary Examiner

W. E. PARKER, Assistant Examiner

U.S. Cl. X.R.

252—433, 437, 438, 441, 463; 260—101, 326.62, 553, 657.5, 708